United States Patent
Korchev et al.

(10) Patent No.: US 9,292,961 B1
(45) Date of Patent: Mar. 22, 2016

(54) SYSTEM AND METHOD FOR DETECTING A STRUCTURAL OPENING IN A THREE DIMENSIONAL POINT CLOUD

(71) Applicant: The Boeing Company, Chicago, IL (US)

(72) Inventors: Dmitriy V. Korchev, Irvine, CA (US); Zhiqi Zhang, Santa Clara, CA (US); Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 14/468,508

(22) Filed: Aug. 26, 2014

(51) Int. Cl.
  *G06T 17/00* (2006.01)
  *G06T 15/08* (2011.01)
  *G06T 15/20* (2011.01)
  *G06T 17/05* (2011.01)

(52) U.S. Cl.
  CPC .............. *G06T 15/08* (2013.01); *G06T 15/205* (2013.01); *G06T 17/05* (2013.01); *G06T 2215/12* (2013.01)

(58) Field of Classification Search
  CPC ......... G06T 15/08; G06T 17/00; G06T 19/00; G06T 15/005; G06T 15/40
  See application file for complete search history.

(56) References Cited

U.S. PATENT DOCUMENTS

| | | | | |
|---|---|---|---|---|
| 7,995,055 | B1* | 8/2011 | Ma | G06K 9/4604 345/420 |
| 2005/0057561 | A1* | 3/2005 | El-Din ElShishiny | G06T 17/20 345/419 |
| 2010/0328308 | A1* | 12/2010 | Gamliel | G06T 17/20 345/420 |
| 2014/0125671 | A1* | 5/2014 | Vorobyov | G06T 17/00 345/427 |
| 2015/0123969 | A1* | 5/2015 | Wang | G06T 7/0028 345/424 |
| 2015/0325039 | A1* | 11/2015 | Lynch | G01C 21/3638 345/419 |
| 2016/0012646 | A1* | 1/2016 | Huang | G06T 19/20 345/419 |

OTHER PUBLICATIONS

Besl et al., "A Method for Registration of 3-D Shapes," *IEEE Transactions on Pattern and Machine Intelligence*, vol. 14, No. 2 (1992).
Rusu et al., "Fast 3D Recognition and Pose Using the Viewpoint Feature Histogram," *The 2010 IEEE/RSJ International Conference on Intelligent Robots and Systems* (2010).
Belongie et al., "Shape Matching and Object Recognition Using Shape Contexts," *IEEE Transactions on Pattern and Machine Intelligence*, vol. 24, No. 24 (2002).
Chen et al., "Object Modeling by Registration of Multiple Range Images," *Proceedings of the 1991 IEEE International Conference on Robotics and Automation* (1991).
Pomerleu et al., "Comparing ICP Variants on Real-World Data Sets," *Autonomous Robots*, vol. 34, No. 3 (2013).
Frome et al., "Recognizing Objects in Range Data Using Regional Point Descriptors," *Proceedings of the European Conference on Computer Vision (ECCV)* (2004).
Johnson, "Spin-Images: A Representation for 3-D Surface Matching," *Carnegie Mellon University Thesis* (1997).

* cited by examiner

*Primary Examiner* — Todd Buttram
(74) *Attorney, Agent, or Firm* — Walters & Wasylyna LLC

(57) ABSTRACT

A method for detecting an opening in a structure represented by a three-dimensional point cloud may include the steps of: (1) creating a three-dimensional point cloud map of a scene, the three-dimensional point cloud map including a plurality of points representing a ground plane and the structure upon the ground plane, (2) identifying an absence of points within the plurality of points representing the structure, and (3) determining whether the absence of points represents the opening in the structure.

16 Claims, 11 Drawing Sheets

SYSTEM AND METHOD FOR DETECTING A STRUCTURAL OPENING IN A THREE DIMENSIONAL POINT CLOUD

FIELD

The present disclosure is generally related to three-dimensional point cloud imaging and, more particularly, to a system and method for detecting a structural opening in a three-dimensional point cloud image.

BACKGROUND

Three-dimensional imaging data, for example, in the form of a three-dimensional point cloud acquired from an imaging sensor, is useful for creating three-dimensional models of a scene. A three-dimensional point cloud includes point data arranged in three dimensions in which the points are defined at various locations by an X, Y, and Z coordinate axis system.

However, three-dimensional point clouds with their sparse and irregular sampling of the scene may look different compared to other types of images. Due to this, images created from three-dimensional point clouds may represent the surface of a structure and determine a shape of the structure but may have limited use, for example, in detecting specific features of the structure.

Accordingly, those skilled in the art continue with research and development efforts in the field of processing three-dimensional point cloud data for detecting structural features, such as structural openings.

SUMMARY

In one embodiment, the disclosed method for detecting an opening in a structure represented by a three-dimensional point cloud may include the steps of: (1) creating a three-dimensional point cloud map of a scene, the three-dimensional point cloud map including a plurality of points representing a ground plane and the structure upon the ground plane, (2) identifying an absence of points within the plurality of points representing the structure, and (3) determining whether the absence of points represents an opening in the structure.

In another embodiment, the disclosed method for detecting an opening in a structure represented by a three-dimensional point cloud may include the steps of: (1) acquiring a plurality of three-dimensional frames representing at least a portion of a scene, each three-dimensional frame including a plurality of points representing at least a portion of a ground plane and at least a portion of the structure upon the ground plane, (2) preprocessing the plurality of three-dimensional frames, (3) creating a three-dimensional point cloud map representing the scene from the plurality of three-dimensional frames, (4) delimiting the three-dimensional point cloud map within a volume, (5) rotating the three-dimensional point cloud map to align the plurality of points representing the ground plane with a horizontal reference plane of the volume, (6) dividing the volume into a plurality of sub-volumes to define a volumetric grid, (7) converting the three-dimensional point cloud map to a plurality of voxels, (8) creating a plurality of voxel strips, each voxel strip being defined by a grouping of vertically aligned voxels, and (9) detecting the opening in the structure from the plurality of voxel strips.

In yet another embodiment, the disclosed system for detecting an opening in a structure represented by a three-dimensional point cloud may include an image sensor capable of acquiring a plurality of three-dimensional frames representing at least a portion of a scene, each three-dimensional frame including a plurality of points representing at least a portion of a ground plane and at least a portion of the structure upon the ground plane, and a computer system including a processor programmed with a set of instructions that, when executed by the processor, causes the processor to: (1) preprocess the plurality of three-dimensional frames, (2) create a three-dimensional point cloud map representing the scene from the plurality of three-dimensional frames, (3) delimit the three-dimensional point cloud map within a volume, (4) rotate the three-dimensional point cloud map to align the plurality of points representing the ground plane with a horizontal reference plane of the volume, (5) convert the three-dimensional point cloud map to a plurality of voxels, (6) create a plurality of voxel strips from the plurality of voxels, each voxel strip being defined by a grouping of vertically aligned voxels, and (7) detect the opening in the structure from the plurality of voxel strips.

Other embodiments of the disclosed system and method will become apparent from the following detailed description, the accompanying drawings and the appended claims.

DETAILED DESCRIPTION

Figure 1:
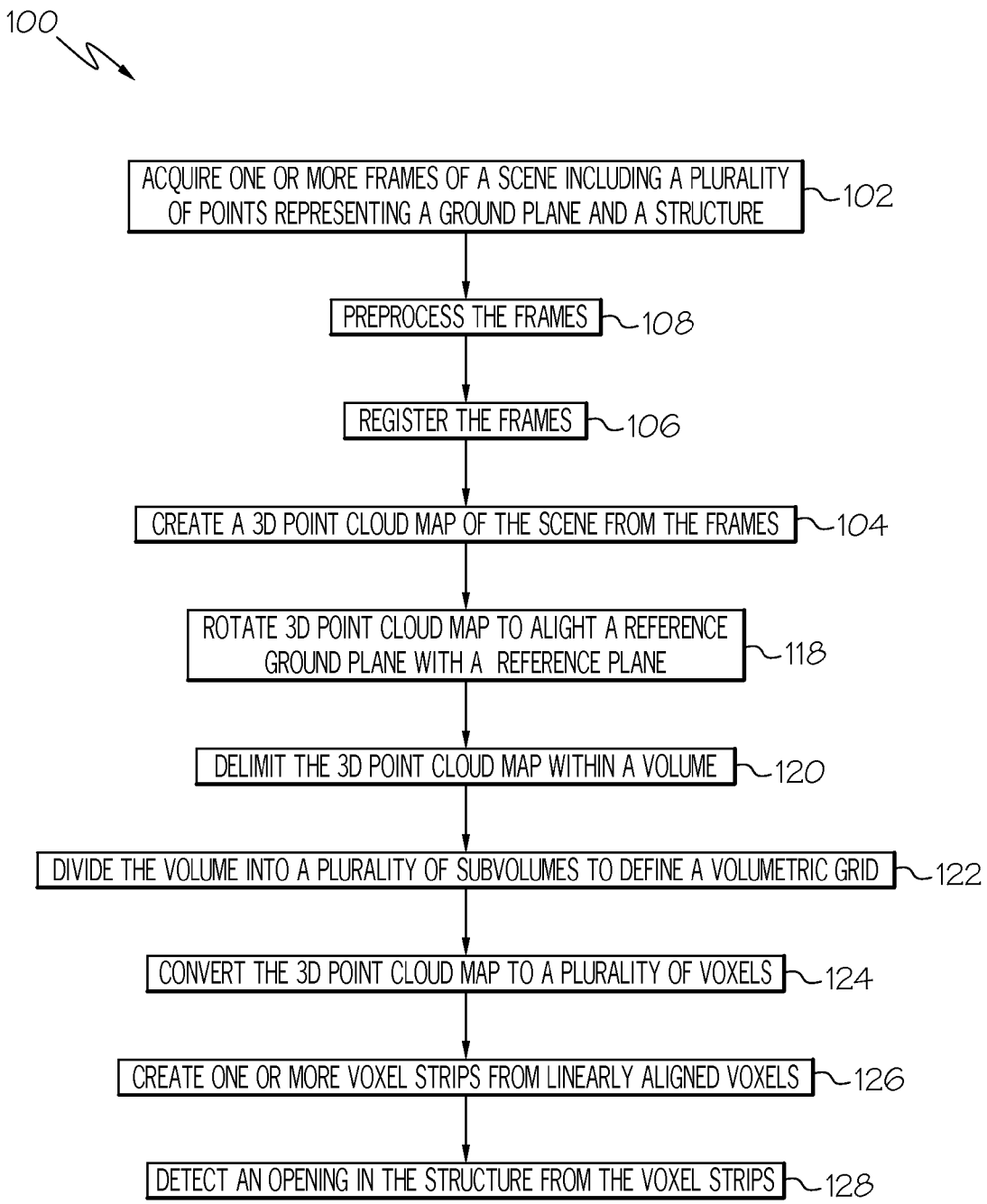
FIG. 1 is a flow diagram of one embodiment of the disclosed method for detecting a structural opening in a three-dimensional point cloud.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
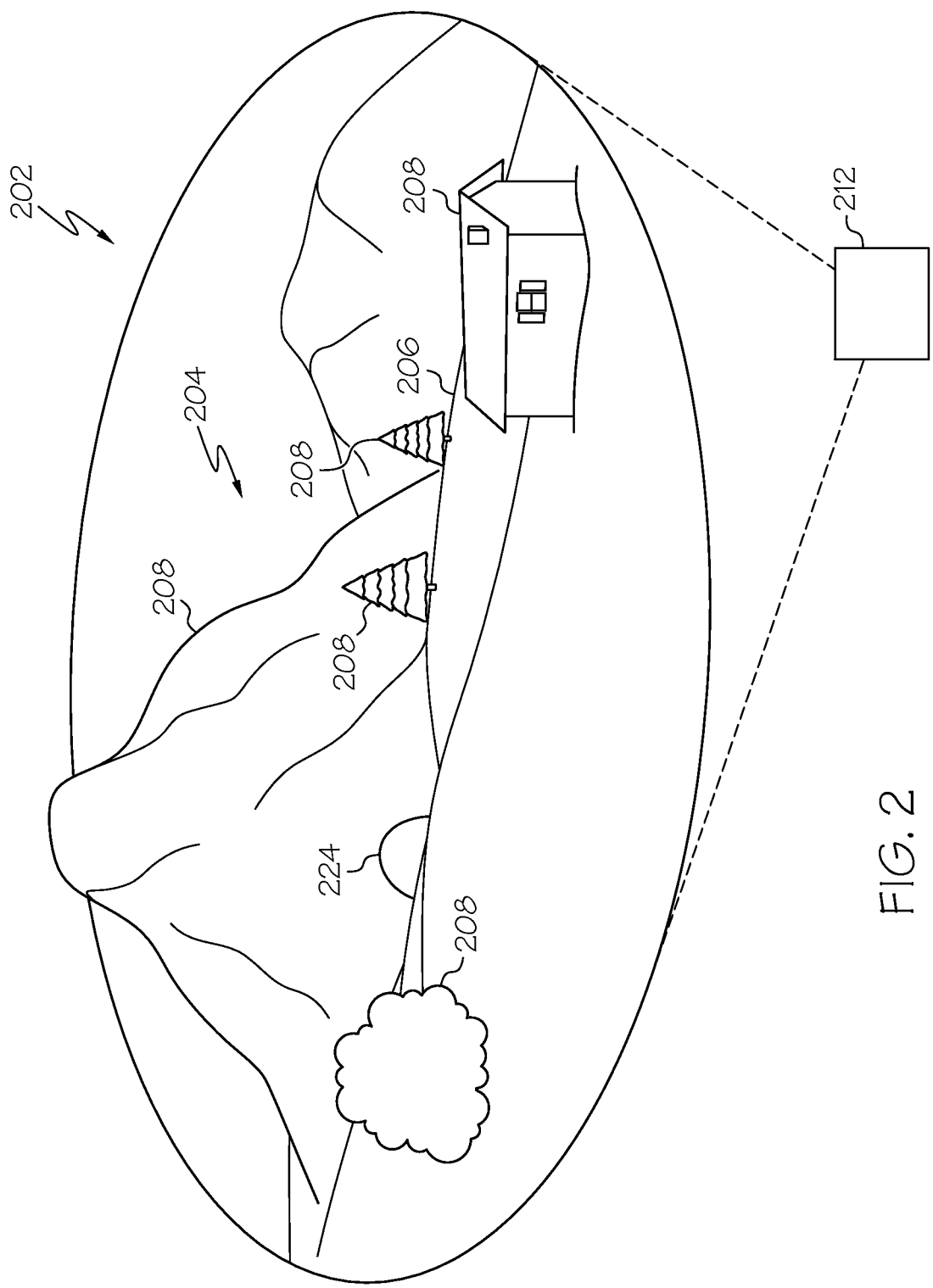
FIG. 2 is a schematic illustration of a scene to be represented by a three-dimensional point cloud map.
Figure 3:
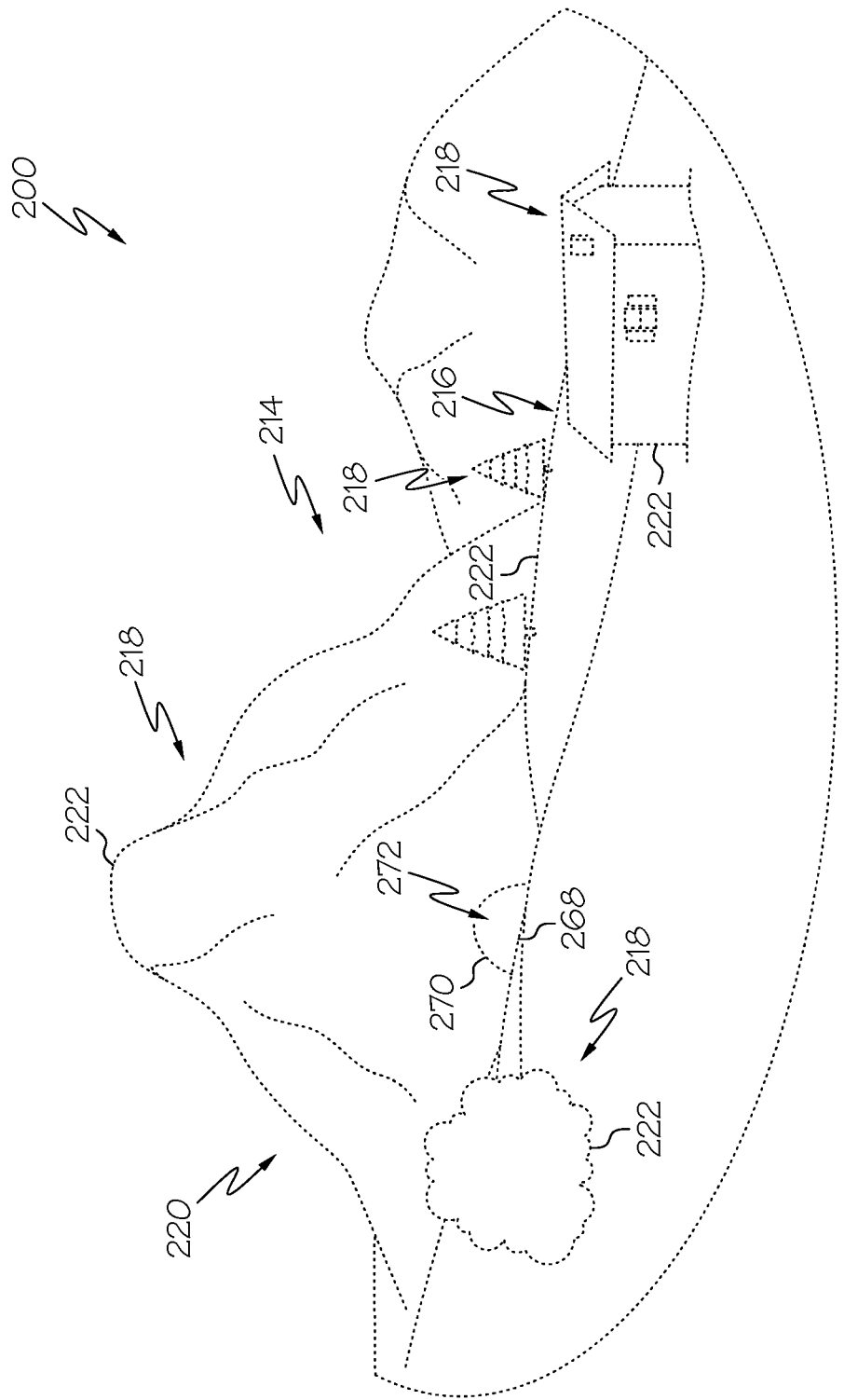
FIG. 3 is a schematic illustration of one embodiment of the 3D point cloud map of the scene represented in FIG. 2.

Referring to FIG. 1, and with reference to FIGS. 2 and 3, one embodiment of the disclosed method, generally designated 100, for detecting a structural opening in a three-dimensional ("3D") point cloud may begin by acquiring at least one 3D frame of a scene 202, as shown at block 102.

Referring to FIG. 2, the scene 202 may include terrain 204. As an example, the terrain 204 may include a ground plane 206 and one or more structures 208. The structures 208 may include any terrain feature, naturally occurring or man-made, that extends vertically from the ground plane 206. For example, the structures 208 may include, but are not limited to, mountains, hills, buildings, rock formations, trees, etc. Some structures 208 may include one or more openings 224 therein. For example, such an opening 224 may be an entrance to a cave or a tunnel, for example, within a side of a mountain.

At least one 3D image sensor 212, also referred to herein as imaging sensor 212, may acquire the 3D point cloud frame 200 (FIG. 3), also referred to herein as a frame 200, of the scene 202. Thus, the frame 200 may be a 3D image (e.g., a virtual snapshot) of the scene 202.

The imaging sensor 212 may be stationary or may be in motion. As an example, a stationary imaging sensor 212 may acquire a single frame 200 of the full scene 202. As another example, a moving image sensor 212 may scan the scene 202 and acquire a plurality (e.g., sequence) of frames 200 of portions of the scene 202 that when combined form the full scene 202.

Although only one imaging sensor 212 is shown in FIG. 2, a plurality of imaging sensors 212 are also contemplated. For example, a plurality of image sensors 212 (e.g., stationary or moving) may acquire a plurality (e.g., a sequence) of frames 200 of a common scene 202. The plurality of frames 200 may be combined to form the full scene 202. The plurality of frames 200 may be acquired at the same time or at different times.

Those skilled in the art will also recognize that the imaging sensor 212 or the plurality of imaging sensors 212 may have respectively different locations and/or orientations when acquiring the frame 200. The location and/or orientation of the imaging sensor 212 may be referred to as the pose of the imaging sensor 212. For example, the imaging sensor 212 may have a pose defined by pose parameters at the moment that the frame 200 (e.g., the 3D image data) is acquired.

Referring to FIG. 3, the frame 200 may include 3D image data of the scene 202 including the terrain 204 (FIG. 2). The 3D image data may take the form of a plurality of points 220 in three-dimensional space (e.g., a 3D point cloud) representing at least a portion of the scene 202. For example, the plurality of points 220 may include a plurality of points 216 representing the ground plane 206 and a plurality of points 218 representing one or more structures 208. One or more frames 200 may be processed to reconstruct a 3D image of the scene 202 (e.g., a 3D point cloud map). In this regard, each point 222 in the 3D point cloud may have an individual x, y and z value, representing the actual surface within the scene 202 in 3D. Only a limited number of individual points 222 are illustrated in FIG. 3 for simplicity and clarity, however, those skilled in the art will recognize that the 3D point cloud may include millions of individual points 222 (e.g., forming the plurality of points 216 representing the ground plane 206 and the plurality of points 218 representing one or more structures 208).

A variety of different types of imaging sensors 212 (FIG. 2) may be used to generate the 3D point cloud (e.g., 3D imaging data) of the frame 200. The disclosed method 100 may be utilized for detection of structural openings in the 3D point cloud obtained from any of these various types of imaging systems. An example of a 3D imaging system (e.g., 3D imaging sensor 212) that generates one or more frames of 3D point cloud data may be a LIDAR (e.g., a flash LIDAR) imaging system. Each image frame of LIDAR data may include a collection of points in three dimensions (e.g., a 3D point cloud) that correspond to multiple range echoes. Other examples of 3D imaging systems that generate 3D point cloud data may include 3D from stereo camera systems, structure from motion systems, and the like.

Referring again to FIG. 1, and with reference to FIGS. 2 and 3, a 3D point cloud map 214 may be created (e.g., built) from one or more frames 200 (FIG. 3) acquired by the imaging sensor 212 (FIG. 2), as shown at block 104. As an example, the 3D point cloud map 214 may be created from a single frame 200 (e.g., a single 3D point cloud) including the plurality of points 220 (e.g., 3D image data) representing the full scene 202. As another example, the 3D point cloud map 214 may be created from a combined plurality of frames 200 (e.g., a combined plurality of 3D point clouds), each including the plurality of points 220 representing the full scene 202 (e.g., at the same or different poses of the imaging sensor 212) or portions of the scene 202 (e.g., at different poses of the imaging sensor 212). As yet another example, the 3D point cloud map 214 may be created from a single frame 200 of the scene 202 and iteratively updated with additional frames 200 of the scene (e.g., at the same or different poses of the imaging sensor 212) to increase the robustness of the 3D point cloud map 214 and detection accuracy.

In an example implementation of the frame acquisition operation (block 102), the imaging sensor 212 (FIG. 2) may be moving (e.g., the imaging system 212 acquires a frame 200, moves, and then acquires another frame 200). Because the imaging sensor 212 lacks a notion of global coordinate positioning, the plurality of frames 200 may not be aligned and/or each frame 200 not include 3D image data of the entire scene 202 (FIG. 2). Thus, the method 100 may include registering the plurality of frames 200, as shown at block 106.

Registering the plurality of frames 200 (block 106) may include aligning the plurality of points 220 of each frame 200 of the plurality of frames 200. For example, the plurality of points 220 (or a portion of the plurality of points 220) of a first frame 200 may be aligned with the associated plurality of points 220 (or a portion of the associated plurality of points 220) of a second frame 200 and so on, in an iterative manner. Aligning the points 222 of each frame 200 may be performed utilizing an Iterative Closest Point ("ICP") algorithm to minimize the difference between two frames 200 (e.g., 3D point clouds). The ICP algorithm may be used to construct the 3D point cloud map 214 of the scene 202 from different frames 200. As an example, a Fast ICP algorithm may be used to optimize implementation of a nearest-neighbor point search. The ICP algorithm may include the following steps: (1) associating points 222 of different frames 200 by a nearest-neighbor criteria (e.g., each point 222 in a first 3D point cloud is associated with the closest point 222 in a second 3D point cloud), (2) estimating transformation parameters (e.g., rotation and/or translation) using a mean square cost function (e.g., the transformation may align each point 222 of the first 3D point cloud to the best matching point 222 of the second 3D point cloud), and (3) transforming the points using the estimated parameters. The ICP algorithm may be run iteratively to re-associate the aligned points 222 with points 222 of a third 3D point cloud and so on.

Those skilled in the art will recognize that the 3D point cloud data in the plurality of frames 200 may be noisy (e.g., the 3D point cloud may include holes caused by occlusions or point position inaccuracies) and/or a target (e.g., a particularly designated structure 208 of the scene 202) may not be represented in each frame 200. Thus, detecting (e.g., searching for) certain structural features may be difficult.

Further, the ICP algorithm may become confused, for example, by the plurality of points 216 (FIG. 3) representing the ground plane 206 (FIG. 2) dominating the 3D point cloud.

For example, a traditional ICP registration operation may align the points 222 representing the ground plane 206 but may miss points 222 representing other parts in the 3D point clouds (e.g., points 222 representing the structure 208).

In order to resolve these issues, the method 100 may include preprocessing the plurality of frames 200 prior to registering the frames 200 (block 106) using the ICP algorithm, as shown at block 108.

Figure 4:
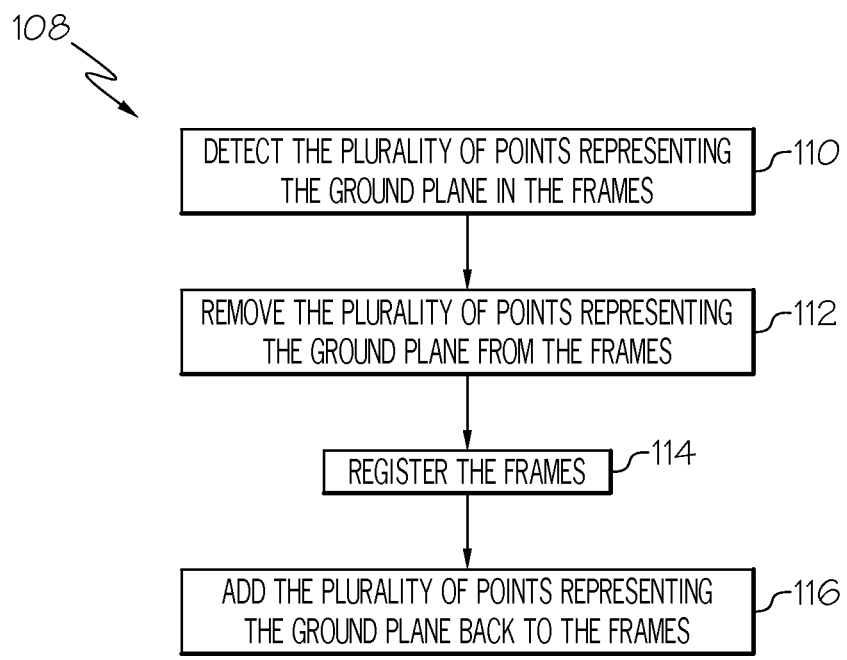
FIG. 4 is a flow diagram of one embodiment of the preprocessing operation represented in FIG. 1.

Referring to FIG. 4, the preprocessing operation (block 108) may include detecting the plurality of points 216 representing the ground plane 206 of the plurality of points 220 representing the scene 202 in each frame 200 of the plurality of frames 200, as shown at block 110. For example, detecting the plurality of point 216 representing the ground plane 206 may utilize a Random Sample Consensus ("RANSAC") method.

As shown at block 112, the plurality of points 216 representing the ground plane 206 may be removed from each frame 200 of the plurality of frames 200. Additionally, other points 222 (e.g., outlying points) may also be removed from each frame 200 of the plurality of frames 200, for example, points 222 that are located farther away than a predetermined or specified distance from the imaging sensor 212 (FIG. 2), points 222 representing background, points 222 corresponding to surface reflections, and the like. Thus, the remaining plurality of points 220 of each frame 200 may only include the plurality of points 218 representing the structure 208.

As shown at block 114, the plurality of frames 200 may be registered. Registering the plurality of frames 200 may include aligning the plurality of points 218 representing the structure 208 of each frame 200 of the plurality of frames 200. For example, the plurality of points 218 (or a portion of the plurality of points 218) representing the structure 208 of a first frame 200 may be aligned with the associated plurality of points 218 (or a portion of the associated plurality of points 218) of a second frame 200 and so on, in an iterative manner. Aligning the points 218 representing the structure 208 of each frame 200 may be performed utilizing the Iterative Closest point ("ICP") algorithm, such as that described above and shown at block 108. Each additional (e.g., new) frame 200 may be processed by the ICP algorithm, which updates the 3D point cloud map 214. The ICP algorithm iteratively revises the transformation (e.g., translation and/or rotation) needed to minimize the distance between the associated points 222 of two frames 200 (e.g., the two 3D point clouds).

Those skilled in the art will recognize that while the frame 200 registration operation shown at block 106 and the frame 200 registration operation shown at block 114 are illustrated as separate operations, they may be separate operations or they may be the same operation. When separate operations, registering the frames 200 (e.g., having the plurality of points 220 representing the scene 202), as shown at block 106, may not be required when the frames 200 are preprocessed, as shown at block 108, because registering the frames 200 (e.g., having the plurality of points 218 representing the structure 208), as shown at block 114, may adequately align the frames 200.

As shown at block 116, the plurality of points 216 representing the ground plane 206 may be added back to each frame 200 of the plurality of frames 200 following registration of the plurality of frames 200 (block 114) to create the 3D point cloud map 214 representing the scene 202.

Thus, the created 3D point cloud map 214 is a robust and complete representation of the scene 202 including the terrain 204, including any structures 208 extending vertically from the ground plane 206. The 3D point cloud map 214 created in such a manner may represent (e.g., display) the opening 224 in the structure 208 with a much better clarity. Any holes introduced by imaging sensor noise may also be reduced. Therefore, we can proceed with the tunnel/cave detection in this map after updating it with a new frame. In the following sections, we will explain how we achieve cave detection in our system.

It should be noted that the preprocessing operation shown and described at block 108 (FIGS. 1 and 4) may be applicable to any ICP based algorithms, not only the implementation described herein for the method 100 for detecting structural openings in 3D point clouds.

Figure 5:
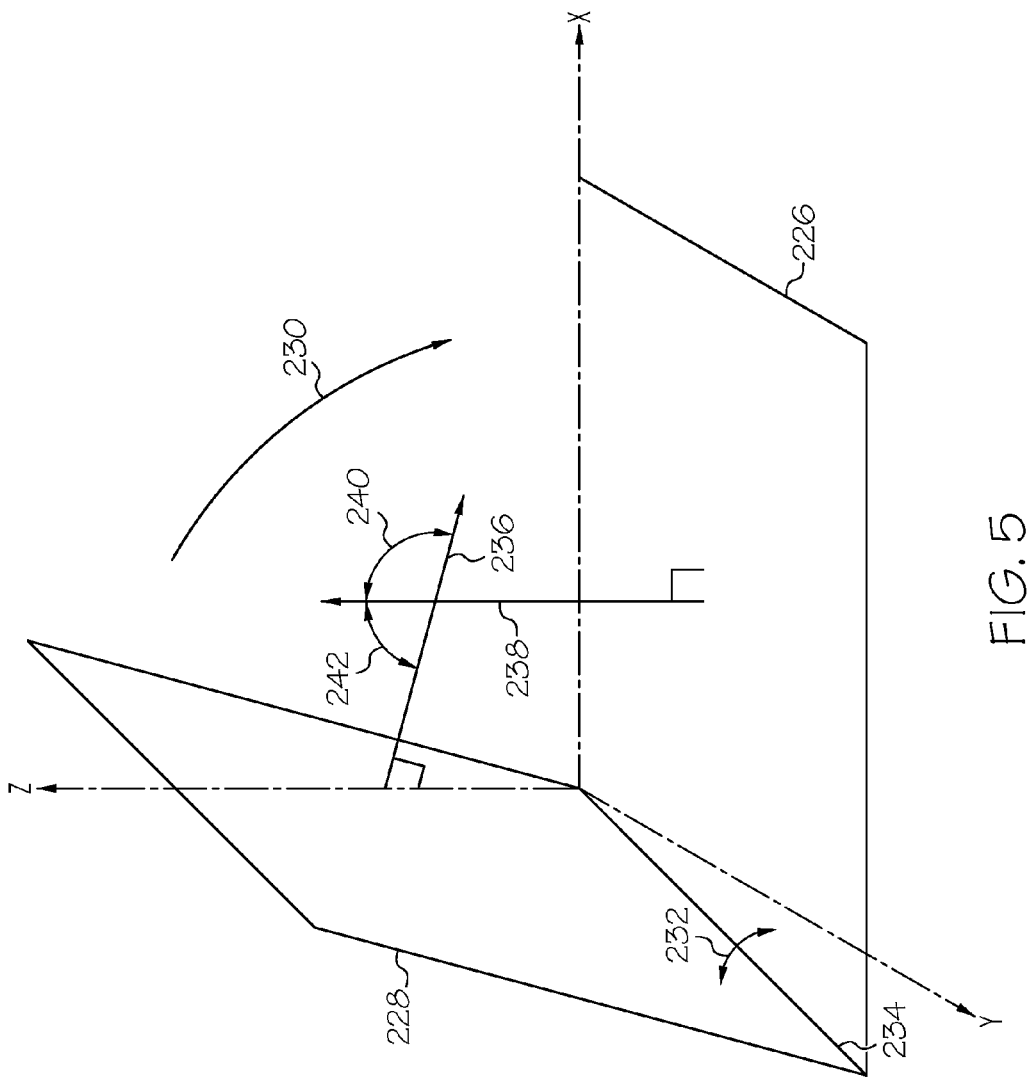
FIG. 5 is a schematic illustration of the rotating operation represented in FIG. 1.

Referring to FIG. 1, and with reference to FIGS. 3 and 5, the 3D point cloud map 214 may be rotated to align a reference ground plane 228 (FIG. 5) with a reference plane 226 (FIG. 5), as shown at block 118. The reference ground plane 228 may be defined in the 3D point cloud map 214 (FIG. 3). The plurality of points 216 representing the ground plane 206 (FIG. 3) of the 3D point cloud map 214 may define the reference ground plane 228. For example, the plurality of points 216 representing the ground plane 206 detected in the preprocessing operation (block 108), as shown at block 110 (FIG. 4), may be used at the reference ground plane 228.

Referring to FIG. 5, in the example implementation, the reference plane 226 may be defined by an X-Y plane (e.g., a plane defined by an X-axis and a Y-axis). In such an implementation, the reference ground plane 228 (e.g., the plurality of points 216 representing the ground plane 206 in the 3D point cloud map 214) may be rotated, in the direction illustrated by direction line 230, to a horizontal orientation. However, other reference planes are also contemplated. For example, the reference ground plane 228 may be rotated to align with a Y-Z plane (e.g., a plane defined by the Y-axis and a Z-axis) such that the reference ground plane 228 may be rotated to a vertical orientation.

In an example implementation, an angle α 232 between the reference ground plane 228 and the reference plane 226 may be found. The reference ground plane 228 (e.g., the 3D point cloud map 214) may be rotated according to angle α 232 about an intersection line 234 (e.g., a line defined by the intersection of the reference ground plane 228 and the reference plane 226). For example, a first normal vector $n_1$ 236 (e.g., a vector normal to the reference ground plane 228) and a second normal vector $n_2$ 238 (e.g., a vector normal to the reference plane 226) may be found (e.g., defined). An angle θ 240 between the first normal vector $n_1$ 236 and the second normal vector $n_2$ 238 may be found (e.g., calculated). The angle π-θ 242 may represent the angle α 232. The 3D point cloud map 214 may be rotated about the intersection line 234 by π-θ degrees (e.g., α degrees) to align the reference ground plane 228 with the reference plane 226 and position the 3D point cloud map 214 in a horizontal orientation.

Unless otherwise indicated, the terms "first," "second," "third," "fourth," etc. are used herein merely as labels, and are not intended to impose ordinal, positional, or hierarchical requirements on the items to which these terms refer.

Figure 6:
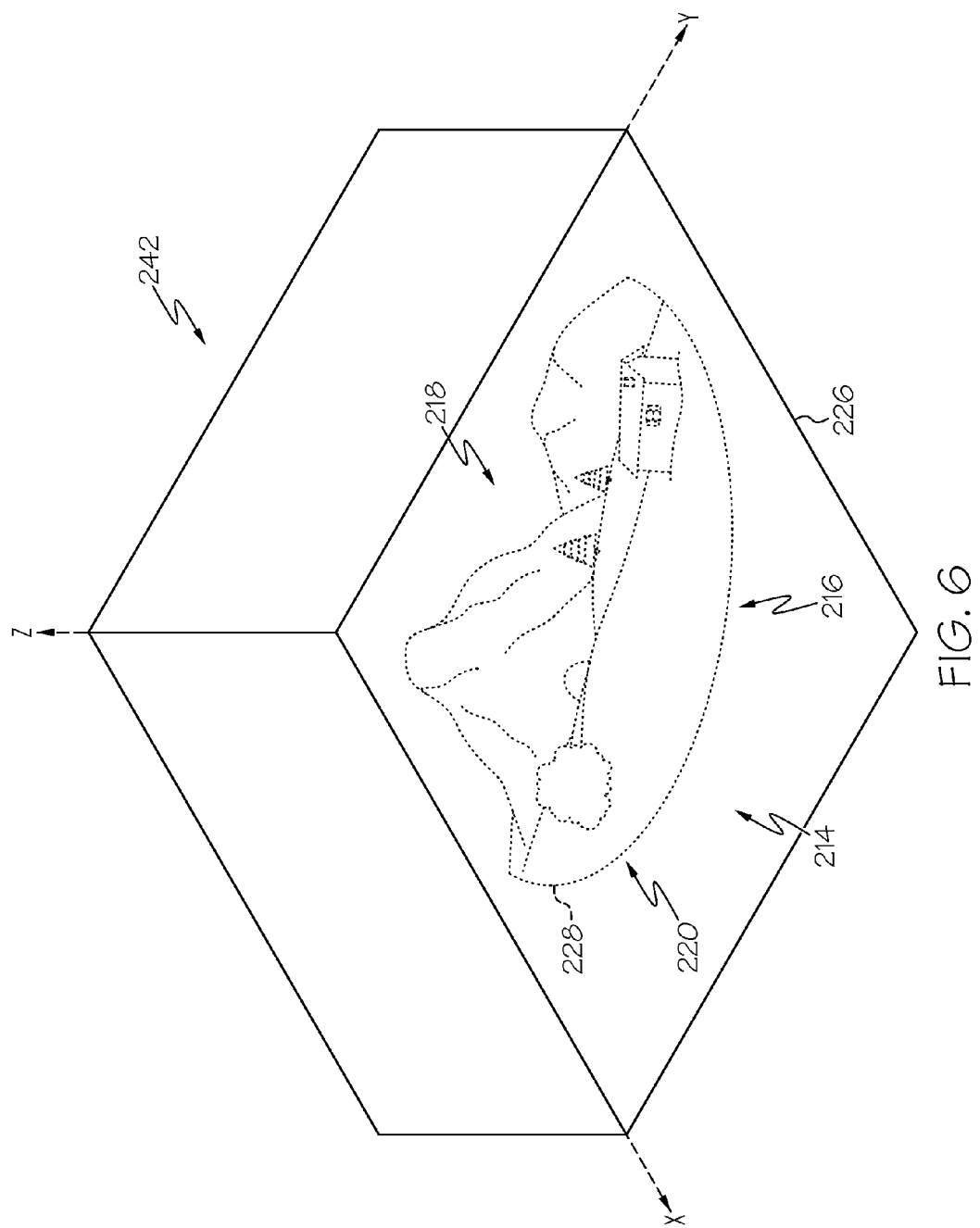
FIG. 6 is a schematic diagram of one embodiment of the delimiting volume for the 3D point cloud map represented in FIG. 3.

Referring to FIG. 6, the 3D point cloud map 214 may be delimited within a three-dimensional delimiting volume 242, as shown at block 120. The volume 242 may define the limits or boundaries of the 3D point cloud map 214. FIG. 6 illustrates a cubic volume (e.g., a cube) 242 defining the three dimensional boundaries of the 3D point cloud map 214. The reference ground plane 228 of the 3D point cloud map 214 is aligned with the X-Y plane (e.g., the reference plane 226) of the cubic volume 242. While the exemplary 3D point cloud map 214 (e.g., 3D image data) is shown delimited within the cubic volume 242, the present disclosure is not limited to a cubic geometry. Those skilled in the art will recognize that a cubic geometry may be a convenient shape to use for this purpose. Thus, the 3D point cloud map 214 may be defined within any other suitable geometric volume.

Figure 7:
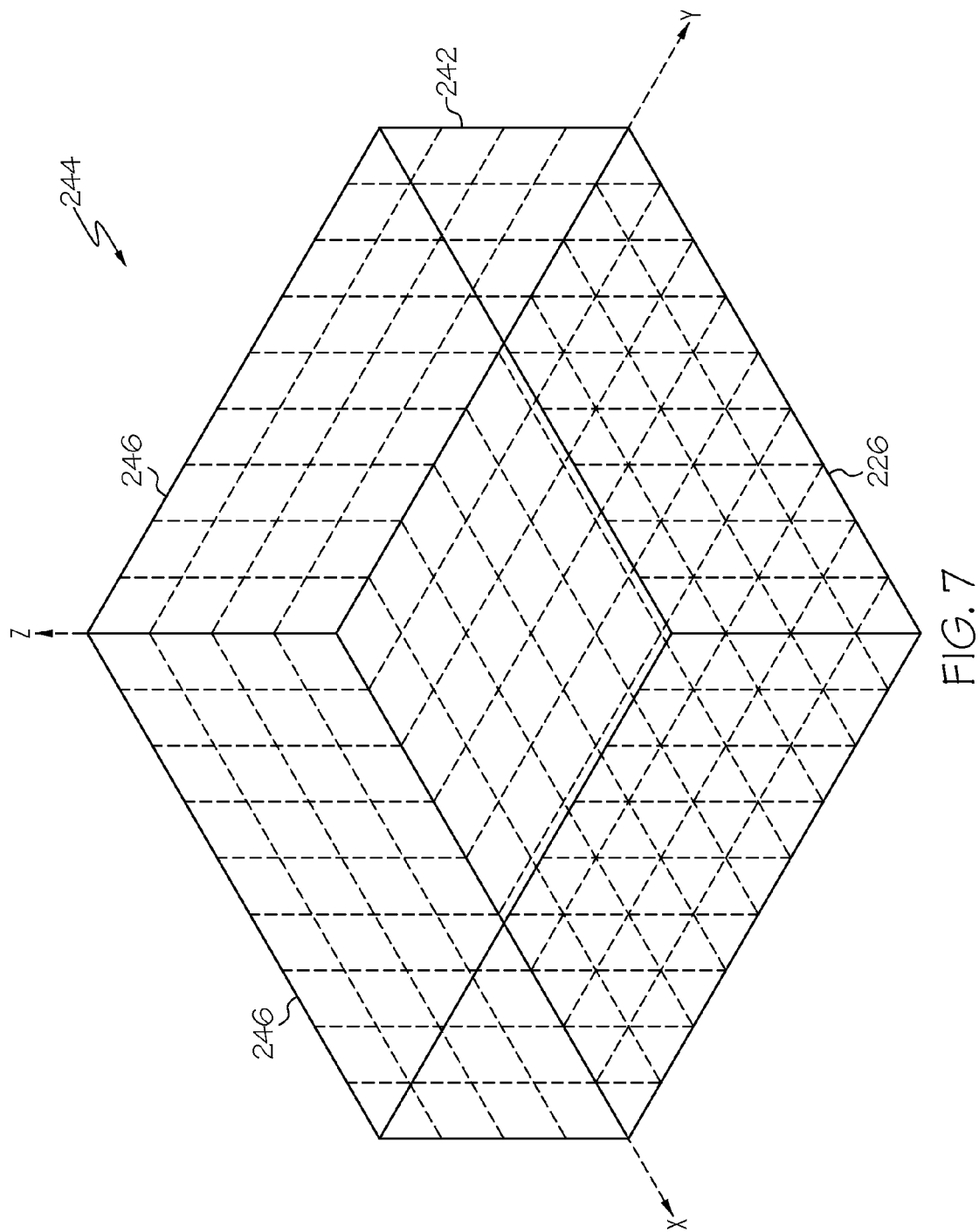
FIG. 7 is a schematic illustration of one embodiment of the volumetric grid formed from the volume represented in FIG. 6.

Referring to FIG. 1, and with reference to FIG. 7, the volume 242 (e.g., total volume defining the boundaries of the 3D point cloud map 214) may be divided into a plurality of sub-volumes 246 defining a volumetric grid 244, as shown at block 122. For example, each sub-volume 246 may have a cube shape, also referred to herein as a cuboid. Other geometric shapes of the plurality of sub-volumes 246 are also contemplated. As a specific, non-limiting example, the volume 242 may be divided into 9,000,000 equal sub-volumes 426 (e.g., cuboids) defining the volumetric grid 244 including 300 X-axis cuboids, 300 Y-axis cuboids, and 300 Z-axis cuboids.

Figure 8:
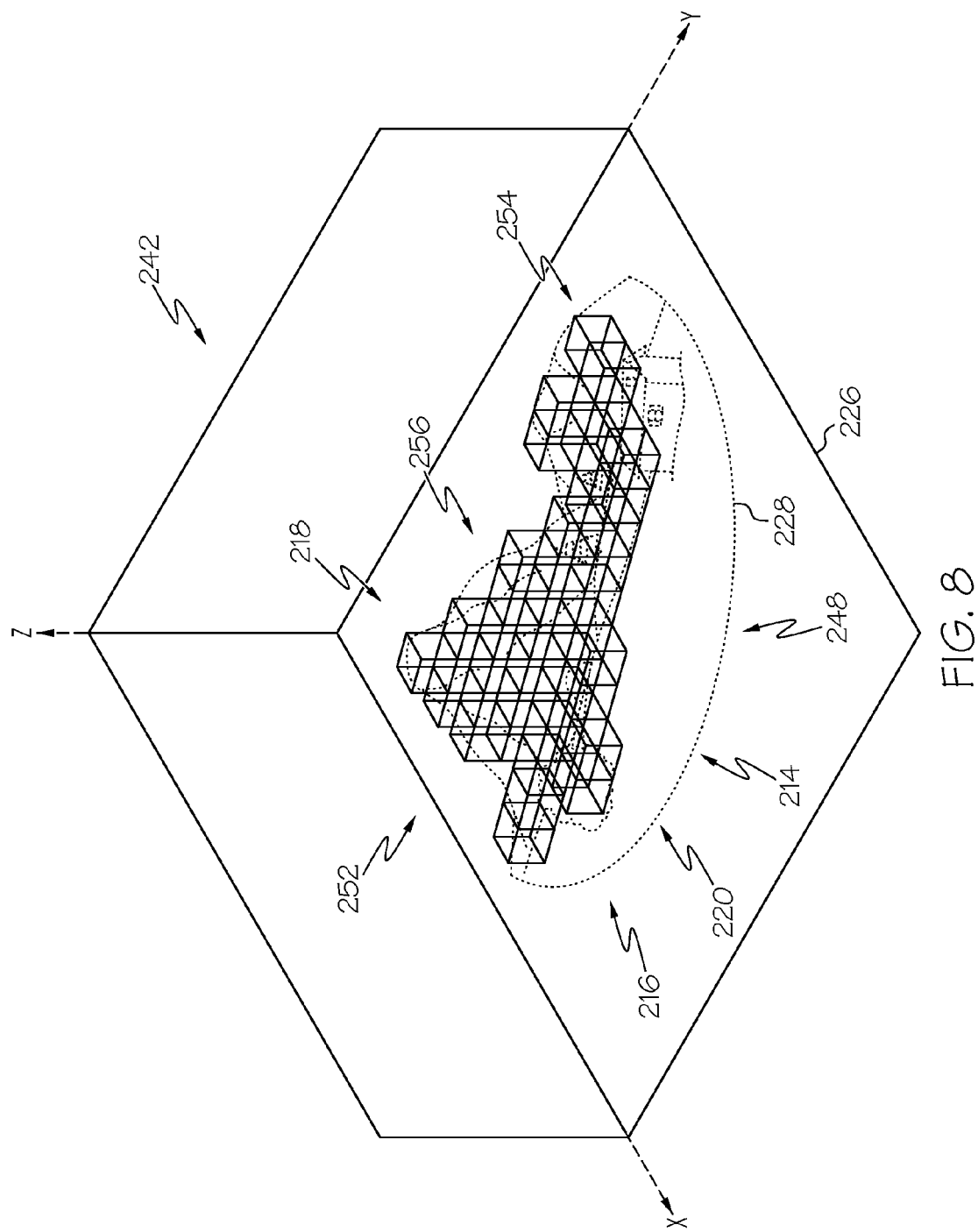
FIG. 8 is a schematic illustration of one embodiment of the voxel grid formed from the 3D point cloud map represented in FIG. 6.
Figure 9:
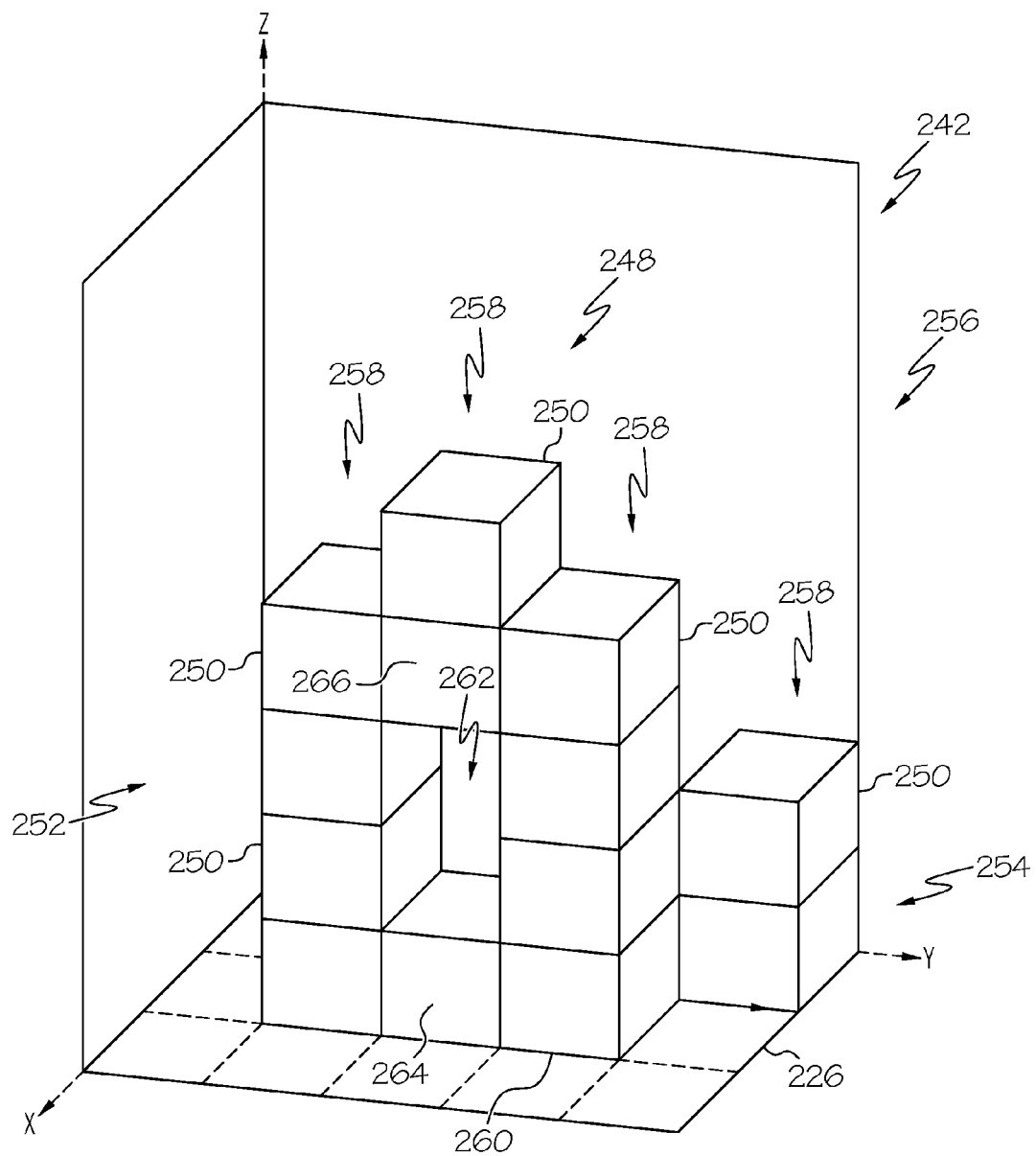
FIG. 9 is a schematic illustration of one embodiment of the voxel strips formed from the voxel grid represented in FIG. 8.

Referring to FIG. 1, and with reference to FIGS. 8 and 9, the 3D point cloud map 214 (e.g., 3D image data) may be converted to a plurality of voxels 248 (also known as volumetric pixels or Volumetric Picture Elements), as shown at block 124. Neighboring points 222 (FIG. 3) of the plurality of points 220 (e.g., representing the ground plane 206 and the structures 208) (FIG. 2) of the 3D point cloud map 214 may be clustered into individual voxels 250. Each voxel 250 of the plurality of voxels 248 may represent one sub-volume 246 (FIG. 7) of the regular volumetric grid 244 (FIG. 7) in three-dimensional space and the points 222 defining the 3D point cloud map 214 located within that sub-volume 246. Thus, the plurality of voxels 248 may define a voxel grid 252 within the delimiting volume 242 representing a voxelized representation of the 3D point cloud map 214.

Creating voxels 250 from neighboring points 222 of the 3D point cloud map 214 may reduce the computational complexity required to process the 3D image data, for example, to detect the opening 210 (FIG. 2) in the structure 208. Only a limited number of individual voxels 250 are illustrated in FIG. 8 for simplicity and clarity, however, those skilled in the art will recognize that the voxel grid 252 may include millions of individual voxels 250 (e.g., forming a plurality of voxels 254 representing the ground plane 206 and a plurality of voxels 256 representing one or more structures 208).

Referring to FIG. 1, and with reference to FIG. 9, one or more voxel strips 258 may be created (e.g., formed or generated) from linearly aligned voxels 250, as shown at block 126. As an example, each voxel strip 258 may be defined by a grouping of aligned voxels 250. In an example implementation, and as shown if FIG. 9, since the 3D point cloud map 214 (FIG. 8) has been rotated to align the reference ground plane 228 with the X-Y plane (e.g., reference plane 226), as shown at block 118, the voxel strips 258 may be defined by voxels 250 aligned along (e.g., parallel to) the Z-axis (e.g., vertically aligned). The plurality of voxels 254 representing the ground plane 206 may be aligned with the X-Y plane (e.g., horizontally oriented) and the plurality of voxels 258 representing the structures 208 may extend from the plurality of voxels 254 representing the ground plane 206 along the Z-axis (e.g., vertically oriented). Thus, all of the voxels 250 that project from the same (e.g., square) grid 260 on the X-Y plane (e.g., the reference plane 226) belong to the same voxel strip 258.

Referring still to FIG. 1, and with reference to FIG. 9, the opening 210 in the structure 208 (FIG. 2) may be detected from the voxel strips 258, as shown at block 128. Each voxel strip 258 may be searched for an absence 262 of one or more voxels 250 along or within the voxel strip 258. The absence 262 of a voxel 250 may represent an absence 272 (FIG. 3) of points 222 within the plurality of points 218 representing the structure 208 of the 3D point cloud map 214 of the scene 202. Accordingly, the absence 262 of voxels 250 within the voxel strip 258 may represent the presence of the opening 210 in the structure 208.

It may be inferred that if the opening 210 (or a part of the opening 210) is contained within the voxel strip 258 (e.g., is represented within the voxel strip 258 by the absence 262 of voxels 250), then the voxel strip 258 may include both a ground voxel 264 representing the ground of the opening 210 and a ceiling voxel 266 representing the ceiling of the opening 210.

Figure 10:
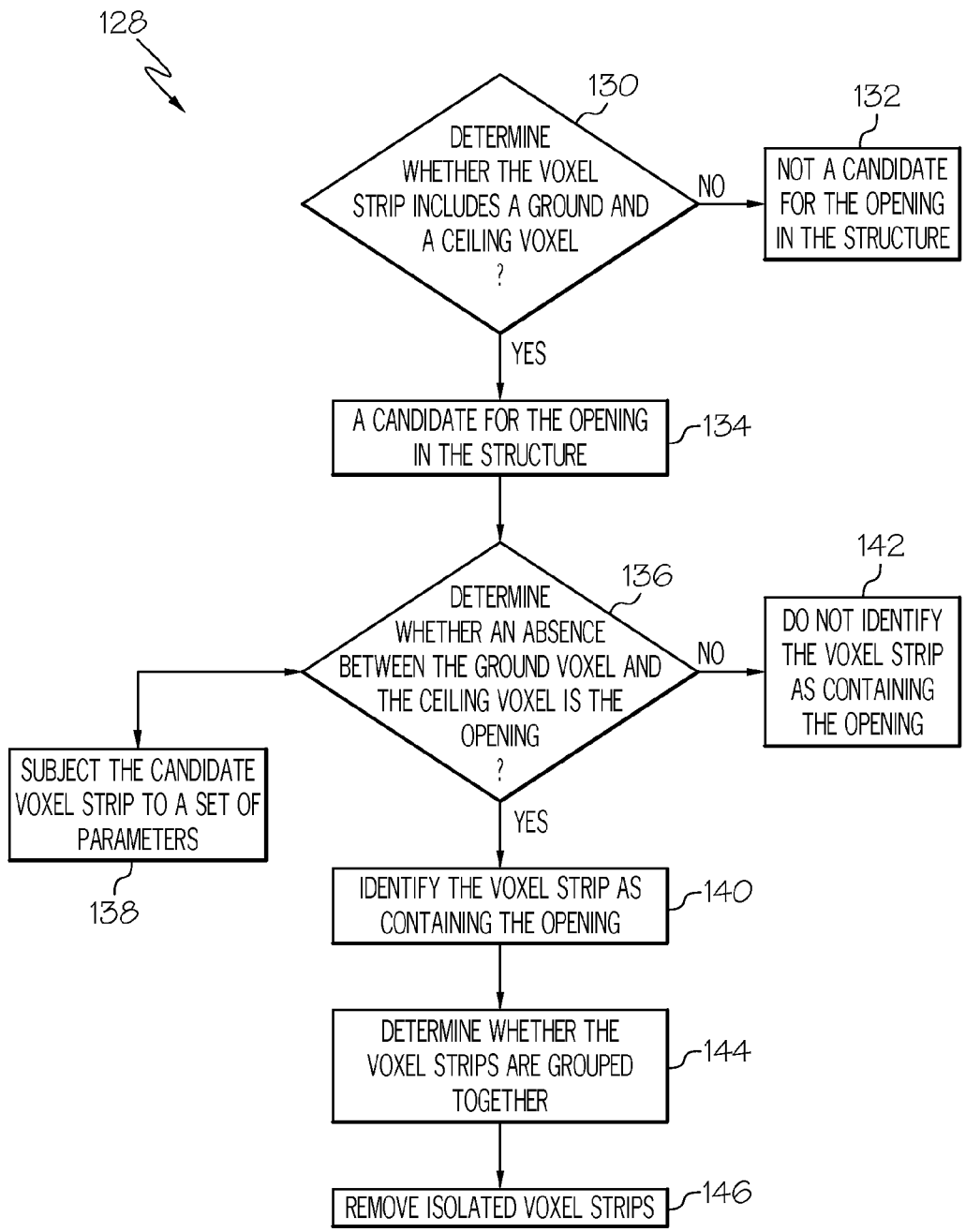
FIG. 10 is a flow diagram of one embodiment of the detecting operation represented in FIG. 1.

Referring to FIG. 10, and with reference to FIG. 9, detecting the opening 210 (FIG. 2) in the structure 208 from the voxel strip 258 may include searching each voxel strip 258 and determining whether the voxel strip 258 includes both the ground voxel 264 and the ceiling voxel 266 (FIG. 9), as shown at block 130. The ground voxel 264 may include ground points 268 (FIG. 3) (e.g., a portion of the plurality of points 216) representing the ground plane 206 (FIG. 2), for example, directly below the structure 208. The ceiling voxel 266 may include ceiling points 270 (FIG. 3) (e.g., a portion of the plurality of points 218) representing the structure 208 (FIG. 2), and in particular, the ceiling formed by the opening 210 in the structure 208 over the ground plane 206. Thus, the absence 262 of voxels 250 may be defined by the empty space defined between the ground voxel 264 and the ceiling voxel 266 (e.g., the absence 272 of points 222 defined between the ground points 268 and the ceiling points 270) and may represent the opening 210.

If the voxel strip 258 does not include both the ground voxel 264 and the ceiling voxel 266, then the voxel strip 258 either does not include the absence 262 of voxels 250 or the absence 262 of voxels 250 is not the opening 210 of interest and is not identified as a candidate for containing the opening 210 in the structure 208, as shown at block 132. If the voxel strip 258 does include both the ground voxel 264 and the ceiling voxel 266, then the voxel strip 258 includes the absence 262 of voxels 250 and is identified as a candidate for containing the opening 210 in the structure 208, as shown at block 134.

As shown at block 136, whether the absence 262 of voxels 250 in the voxel strip 258 is the opening 210 of interest may be determined. In order for the absence 262 of voxels 250 (e.g., the absence 272 of points 222) to be the opening 210 of interest, there may need to be relatively large distance between the two neighboring voxels 250 (e.g., the ground voxel 264 and the ceiling voxel 266) within the voxel strip 258. Additionally, there may be an absence 262 of voxels 250 in more than one voxel strip 258.

Accordingly, the distance (e.g., vertical distance) between the two neighboring voxels 250 (e.g., the ground voxel 264 and the ceiling voxel 266) of each voxel strip 258 may be calculated. The distance between the two neighboring voxels 250 may be the dimension (e.g., the vertical dimension) of the absence 262 and, thus, the vertical dimension of the opening 210. The calculated distances (e.g., dimensions) may be sorted from largest to smallest.

As shown at block 138, each candidate voxel strip 258 may be subjected to a set of parameters in order to determine if the absence 262 of voxels 250 represents the opening 210 of interest (e.g., a cave or tunnel opening).

As a specific, non-limiting example, a first parameter of the set of parameters may include determining whether the largest distance between the two neighboring voxels 250 (e.g., the dimension of the largest absence 262) of one (e.g., a first) voxel strip 258 is greater than (e.g., six times greater than) that of the second largest distance between the two neighboring voxels 250 (e.g., the dimension of the second largest absence 262) of another (e.g., a second) voxel strip 258.

As a specific, non-limiting example, a second parameter of the set of parameters may include determining whether the largest distance between the two neighboring voxels 250 (e.g., the dimension of the largest absence 262) is greater than (e.g., twenty times greater than) that of the dimension (e.g., the vertical dimension along the Z-axis) of the voxel 250. The vertical dimension of the voxel 250 may be the vertical dimension of the volume 242 along the Z-axis divided by the total number of sub-volumes 246 making up the volumetric grid 244 (FIG. 7). As a specific example, and in accordance with the non-limiting example provided above, the vertical dimension of the voxel 250 may be the vertical dimension of the volume 242 along the Z-axis divided by 300.

As a specific, non-limiting example, a third parameter of the set of parameters may include determining whether one of the two neighboring voxels 250 belongs to the ground plane 206 (FIG. 2). For example, it may be determined whether the ground voxel 264 of the voxel strip 258 belongs to the plurality of voxel 254 representing the ground plane 206.

If the set of parameters is met, then the candidate voxel strip 258 (e.g., the absence 262) is identified as the opening 210 of interest, as shown at block 140. If the set of parameters is not met, then the candidate voxel strip 258 (e.g., the absence 262) is not identified as the opening 210 of interest, as shown at block 142.

Those skilled in the art will recognize that the numeric values expressed above are example implementations of the set of parameters and other numeric values are also contemplated. Further, the numeric values may be tuned (e.g., adjusted) as needed to more accurately detect the opening 210 in the structure 208.

In certain situations, a false detection of the opening 210 may result, for example, due to sensor noise and/or occlusions. Such a false detection may include both a ground voxel 264 and a ceiling voxel 266 in the voxel strip 258. To address potentially false detections, the voxel strip 258 may be constantly determined to include the opening in each successive frame 200 forming the 3D point cloud map 214.

As a specific, non-limiting example, for each frame 200, if the voxel strip 258 meets all the requirements of the set of parameters (block 138), the probability that the voxel strip 258 was detected as part of the opening 210 in all the previous frames 200 may be checked. If the probability is greater than p, the voxel strip 258 may be considered to represent (e.g., contain) the opening 210. In order to measure the probability of each detected voxel strip 258, a probability map may be maintained. The size of the probability map may be equal to number of grids 260 defining the X-Y plane (e.g., the reference plane 226). For example, each voxel strip 258 includes a projected position on the X-Y plane corresponding to a grid 260. In accordance with the non-limiting example provided above, the X-Y plane may include a 300 by 300 grid.

The probability map may be updated according to each current detecting result during the disclosed method 100. If a target voxel strip 258 is detected, the associated X-Y plane projection position (e.g., grid 260) may be calculated and an integer value (e.g., a 1) may be added to the corresponding element of the probability map. In this way, each value of the probability map may represent how many times the X-Y projection position (e.g., grid 260) has been detected as part of the opening 210 up to current frame 200. The probability map works because all the frames 200 forming the 3D point cloud map 214 have already been aligned in the same coordinate system by ICP algorithm. This process may avoid most false detections, since a majority of the false detections are due to random noise and are detected as the target with a very low probability.

As shown at block 144, whether the voxel strips 258 identified as representing (e.g., containing) the opening 210 of interest are grouped together in a continuous area may be determined. For example, the X-Y plane projection of all the voxel strips 258 that were detected as containing the opening 210 may be checked to ensure that they are in a continuous neighboring area.

As shown at block 146, isolated voxel strips 258 (e.g., voxel strips 258 that are not grouped together in a continuous area and do not contain the opening 210) may be removed. In order to remove the isolated voxel strips 258 and make the detected voxel strips 258 continuous in the neighboring area, a morphological (e.g., connected component analysis) process may be used to smooth the neighboring voxel strips 258 and remove the isolated voxel strips 258.

As an example, all the voxel strips 258 that have been detected as containing at least part of the opening 210 (block 140) may be projected to X-Y plane. A binary map may be created from the voxel strips 258 projected to the X-Y plane. For example, a "1" may indicate that the projection area is from the voxel strip 258 that contains at least a portion of the opening 210 and a "0" may indicate that the projection area is from the voxel strip 258 that does not contain at least a portion of the opening 210. The morphological operations may "dilate" and "erode" to make the detected voxel strips 258 continuous in the neighboring area. Connected component analysis may be used to remove small projected blobs and/or blobs whose footprint on the horizontal plane do not meet a size and/or shape corresponding to the opening 210. For each "1" in the processed projection binary map, the corresponding voxel strip 258 may the final detection result containing the opening 210; otherwise, it is removed as an isolated voxel strip 258.

The disclosed method 100 may be implemented or embodied as a computer (e.g., data processing) system or a computer program product. Accordingly, the disclosed method may take the form as an entirely hardware embodiment, an entirely software embodiment, or a hardware/software embodiment.

Figure 11:
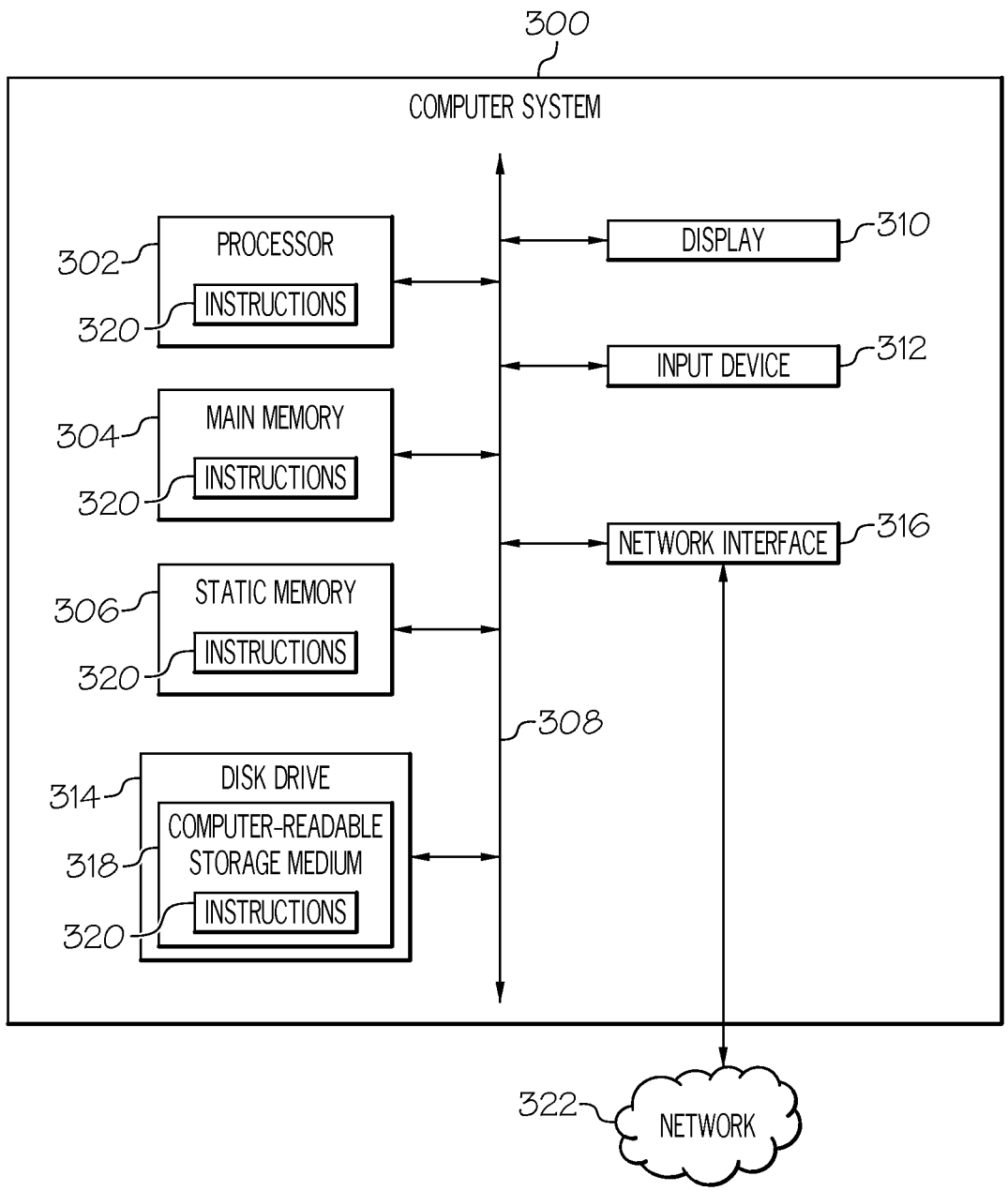
FIG. 11 is a schematic block diagram of one embodiment of the disclosed computer system for implementing the method represented in FIG. 1.

FIG. 11 illustrates one embodiment of the disclosed computer system, generally designated 300, for providing an operating environment for the disclosed method 100. For example, the method 100 may be implemented in one computer system 300 or in several interconnected computer systems 300. The computer system 300 may include any collection of computing devices that individually or jointly execute a set (or multiple sets) of instructions to implement any one or more of the operations discussed herein. Any type of computer system 300 or other apparatus adapted for carrying out the methods described herein may be utilized. A typical combination of hardware and software may be a general-purpose computer system 300. The general-purpose computer system 300 may include a computer program that can control the computer system 300 such that it carries out the methods described herein.

As an example, the computer system 300 may take the form of a computer program product on a computer-usable storage medium (e.g., a hard disk, a CD-ROM, solid state memory, or the like). The computer-usable storage medium may include computer-usable program code embodied thereon. As used herein, the term computer program product may refer to a device including features enabling the implementation of the methods described herein. The terms computer program, software application, computer software routine, and/or other variants of these terms may mean any expression, in any language, code, or notation, of a set of instructions intended to cause a computing system having information processing capability to perform a particular function either directly or after either or both of the following: a) conversion to another language, code, or notation; or b) reproduction in a different material form.

The computer system 300 may include various types of computing systems and/or devices, including a server computer, a client user computer, a personal computer ("PC"), a tablet PC, a laptop computer, a desktop computer, a control system, a network router, switch or bridge, or any other device capable of executing a set of instructions (sequential or otherwise) that specifies actions to be taken by that device. The computer system 300 may also include any electronic device that provides voice, video, and/or data communication.

The computer system 300 may include a processor 302 (e.g., a central processing unit ("CPU"), a graphics processing unit ("GPU"), or both), a main memory 304 and a static memory 306, which communicate with each other via a bus 308. The computer system 300 may include a display 310 (e.g., a video display) and an input device 312 (e.g., a keyboard, a mouse, etc.), a disk drive 314, and/or a network interface 316 (e.g., connected to a network 322).

The disk drive 314 may include a computer-readable storage medium (e.g., a non-transitory computer-readable medium) 318 on which is stored one or more sets of instructions 320 (e.g., software code) configured to implement one or more of the operation, procedures, or functions described herein. The instructions 320 may reside, completely or partially, within the main memory 304, the static memory 306, and/or the processor 302 during execution thereof by the computer system 300. The main memory 304 and the processor 302 may constitute machine-readable media.

While the computer-readable storage medium 318 is shown in an exemplary embodiment to be a single storage medium, the computer-readable storage medium may include a single medium or multiple media (e.g., a centralized or distributed database, and/or associated caches and servers) that store the one or more sets of instructions. The computer-readable storage medium may also include any medium that is capable of storing, encoding, or carrying a set of instructions for execution by the machine and that cause the machine to implement any one or more of the methodologies of the present disclosure.

For example, the computer-readable medium may include, but not be limited to, solid-state memories such as a memory card or other package that houses one or more read-only (e.g., non-volatile) memories, random access memories, or other re-writable (e.g., volatile) memories; magneto-optical or optical medium such as a disk or tape; carrier wave signals such as a signal embodying computer instructions in a transmission medium; and/or a digital file attachment or other self-contained information archive or set of archives considered to be a distribution medium equivalent to a tangible storage medium.

Further, dedicated hardware implementations including, but not limited to, application-specific integrated circuits, programmable logic arrays, and other hardware devices may also be constructed to implement the methods described herein.

Those skilled in the art will recognize that the computer system 300 illustrated in FIG. 11 is one example and any other suitable computer systems 300 may be used without limitation.

Although various embodiments of the disclosed system and method have been shown and described, modifications may occur to those skilled in the art upon reading the specification. The present application includes such modifications and is limited only by the scope of the claims.

What is claimed is:

1. A method for detecting an opening in a structure represented by a three-dimensional point cloud, said method comprising:
    creating a three-dimensional point cloud map of a scene, said three-dimensional point cloud map comprising a plurality of points representing a ground plane and said structure upon said ground plane;
    rotating said three-dimensional point cloud map to align said plurality of points representing said ground plane with a reference plane of a delimiting volume;
    converting said plurality of points representing said ground plane and said structure to a plurality of voxels, said plurality of voxels forming a voxel grid representing said three-dimensional point cloud map;
    forming a plurality of voxel strips, each voxel strip being defined by a grouping of aligned voxels;
    determining whether each voxel strip of said plurality of voxel strips comprises a ground voxel and a ceiling voxel; and
    determining whether an absence of said voxels defined between said ground voxel and said ceiling voxel represents said opening in said structure.

2. The method of claim 1 wherein said delimiting volume comprises an X-axis, a Y-axis, and a Z-axis, wherein said reference plane comprises an X-Y plane, wherein said voxel strips extend along said Z-axis, and wherein said voxel comprises a Z-axis dimension.

3. The method of claim 2 wherein determining whether said absence of said voxels between said ground voxel and said ceiling voxel represents said opening in said structure comprises:
    calculating a Z-axis dimension between said ground voxel and said ceiling voxel of said each voxel strip of said plurality of voxel strips;
    sorting a plurality of Z-axis dimensions between said ground voxel and said ceiling voxel of said plurality of voxel strips from a largest Z-axis dimension to a smallest Z-axis dimension; and
    subjecting said plurality of voxel strips to a set of parameters.

4. The method of claim 3 wherein said set of parameters comprises:
    determining whether said largest Z-axis dimension of said plurality Z-axis dimensions is greater than a next largest Z-axis dimension of said plurality Z-axis dimensions;
    determining whether said largest Z-axis dimension is larger than said Z-axis dimension of said voxel;
    determining whether said ground voxel associated with said largest Z-axis dimension belongs to said ground plane; and
    identifying said absence of said voxels between said ground voxel and said ceiling voxel as said opening in said structure.

5. The method of claim 3 further comprising:
    grouping said plurality of voxel strips comprising said absence of said voxels together; and
    removing isolated voxel strips from said plurality of voxel strips.

6. The method of claim 1 wherein converting said plurality of points representing said ground plane and said structure to said plurality of voxels comprises:
    dividing said delimiting volume into a plurality of sub-volumes to form a volumetric grid; and grouping points of said plurality of points representing said ground plane and said structure located within each sub-volume to create said plurality of voxels,
wherein said each sub-volume is a percentage of said delimiting volume.

7. The method of claim 1 wherein said three-dimensional point cloud map comprises a plurality of three-dimensional point cloud frames, and wherein each three-dimensional point cloud frame comprises at least a portion of said plurality of points representing said ground plane and said structure of said three-dimensional point cloud map.

8. The method of claim 7 further comprising registering said plurality of three-dimensional point cloud frames by aligning said plurality of points representing said ground plane and said structure of said each three-dimensional point cloud frame in an iterative manner.

9. The method of claim 7 further comprising:
removing said plurality of points representing said ground plane from said each three-dimensional point cloud frame;
registering said plurality of three-dimensional point cloud frames by aligning said plurality of points representing said structure of said each three-dimensional point cloud frame in an iterative manner; and
adding said plurality of points representing said ground plane back to said each three-dimensional point cloud frame.

10. The method of claim 9 wherein aligning said plurality of points representing said structure of said each three-dimensional point cloud frame comprises using an Iterative Closest Point algorithm.

11. A method for detecting an opening in a structure represented by a three-dimensional point cloud, said method comprising:
acquiring a plurality of three-dimensional point cloud frames representing at least a portion of a scene, each three-dimensional point cloud frame comprising a plurality of points representing at least a portion of a ground plane and at least a portion of said structure upon said ground plane;
preprocessing said plurality of three-dimensional frames;
creating a three-dimensional point cloud map representing said scene from said plurality of three-dimensional point cloud frames;
delimiting said three-dimensional point cloud map within a volume;
rotating said three-dimensional point cloud map to align said plurality of points representing said ground plane with a horizontal reference plane of said volume;
converting said three-dimensional point cloud map to a plurality of voxels, said plurality of voxels forming a voxel grid representing said three-dimensional point cloud map;
creating a plurality of voxel strips, each voxel strip being defined by a grouping of vertically aligned voxels; and
determining whether each voxel strip of said plurality of voxel strips comprises a ground voxel and a ceiling voxel; and
determining whether an absence of said voxels defined between said ground voxel and said ceiling voxel represents said opening in said structure.

12. The method of claim 11 wherein preprocessing said plurality of three-dimensional point cloud frames comprises:
removing said plurality of points representing said ground plane from said each three-dimensional point cloud frame;
registering said plurality of three-dimensional point cloud frames by aligning said plurality of points representing said structure of said each three-dimensional point cloud frame in an iterative manner; and
adding said plurality of points representing said ground plane back to said each three-dimensional point cloud frame.

13. The method of claim 11 wherein determining whether said absence of said voxels between said ground voxel and said ceiling voxel represents said opening in said structure comprises:
calculating a vertical dimension between said ground voxel and said ceiling voxel of said each voxel strip;
sorting a plurality vertical dimensions from a largest Z-axis dimension to a smallest Z-axis dimension; and
subjecting said plurality of voxel strips to a set of parameters.

14. A system for detecting an opening in a structure represented by a three-dimensional point cloud, said system comprising:
an image sensor capable of acquiring a plurality of three-dimensional point cloud frames representing at least a portion of a scene, each three-dimensional point cloud frame comprising a plurality of points representing at least a portion of a ground plane and at least a portion of said structure upon said ground plane; and
a computer system comprising a processor programmed with a set of instructions that, when executed by said processor, causes said processor to:
preprocess said plurality of three-dimensional point cloud frames;
create a three-dimensional point cloud map representing said scene from said plurality of three-dimensional point cloud frames;
delimit said three-dimensional point cloud map within a volume;
rotate said three-dimensional point cloud map to align said plurality of points representing said ground plane with a horizontal reference plane of said volume;
convert said three-dimensional point cloud map to a plurality of voxels, said plurality of voxels forming a voxel grid representing said three-dimensional point cloud man;
create a plurality of voxel strips from said plurality of voxels, each voxel strip being defined by a grouping of vertically aligned voxels; and
determine whether each voxel strip of said plurality of voxel strips comprises a ground voxel and a ceiling voxel; and
determine whether an absence of said voxels defined between said ground voxel and said ceiling voxel represents said opening in said structure.

15. The system of claim 14 wherein said set of instructions, when executed by said processor, causes said processor to:
remove said plurality of points representing said ground plane from said each three-dimensional point cloud frame;
register said plurality of three-dimensional point cloud frames by aligning said plurality of points representing said structure of said each three-dimensional point cloud frame in an iterative manner; and
add said plurality of points representing said ground plane back to said each three-dimensional point cloud frame.

16. The system of claim 14 wherein said set of instructions, when executed by said processor, causes said processor to:
calculate a vertical dimension between said ground voxel and said ceiling voxel of said each voxel strip;

sort a plurality vertical dimensions from a largest Z-axis dimension to a smallest Z-axis dimension; and
subject said plurality of voxel strips to a set of parameter.

* * * * *